June 20, 1950  M. MASSIELLO  2,512,356
CONVEYER SYSTEM FOR OVEN TRAYS AND THE LIKE
Filed Sept. 3, 1947  4 Sheets-Sheet 1
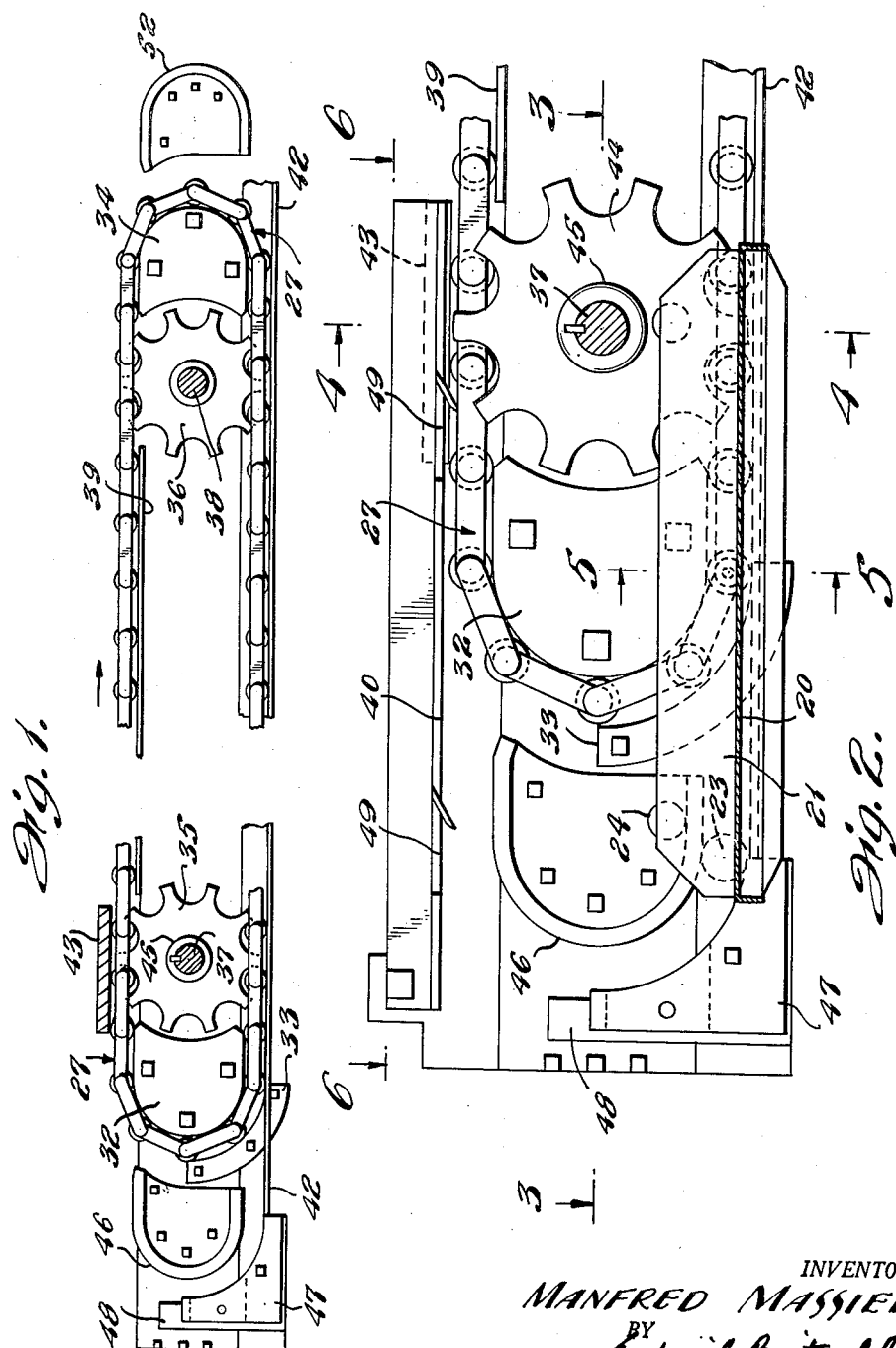
INVENTOR.
MANFRED MASSIELLO
BY Frederick Breitenfeld
ATTORNEY June 20, 1950     M. MASSIELLO     2,512,356
CONVEYER SYSTEM FOR OVEN TRAYS AND THE LIKE
Filed Sept. 3, 1947     4 Sheets-Sheet 2
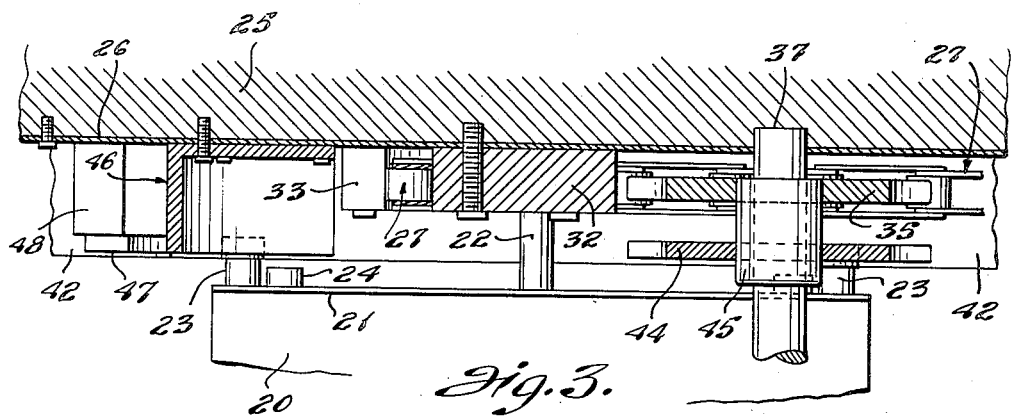
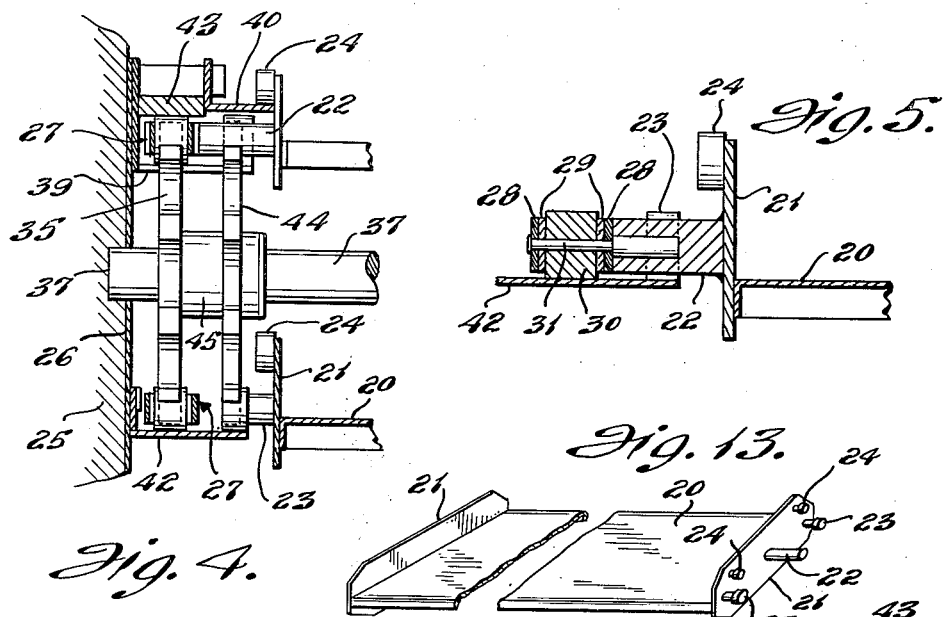
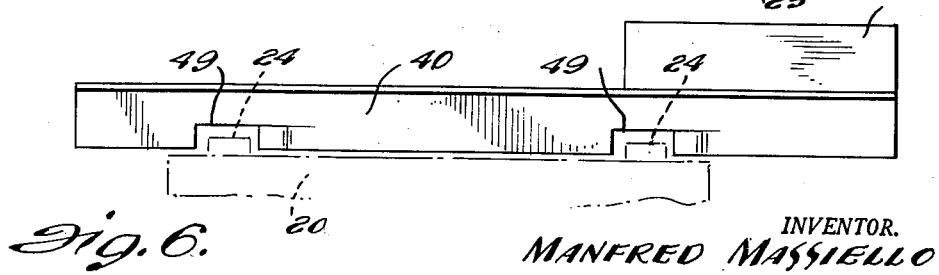
INVENTOR.
MANFRED MASSIELLO
BY Frederick Breitenfeld
ATTORNEY INVENTOR.
MANFRED MASSIELLO
BY Frederick Breitenfeld
ATTORNEY INVENTOR.
MANFRED MASSIELLO
BY
Frederick Breitenfeld
ATTORNEY Patented June 20, 1950

2,512,356

UNITED STATES PATENT OFFICE 2,512,356

CONVEYER SYSTEM FOR OVEN TRAYS
AND THE LIKE

Manfred Massiello, Englewood, N. J., assignor to
Charles Gottfried, New York, N. Y.

Application September 3, 1947, Serial No. 771,889

13 Claims. (Cl. 198—138)

My present invention relates generally to conveyor systems, and has particular reference to a conveyor permanently associated with a series of spaced tray elements or the like and continuously transporting them along a closed path of travel.

A conveyor of the present improved type may find utility in a variety of arts, but is primarily intended for baking ovens. Therefore, to explain the features of the invention I have herein illustrated and shall hereinafter describe a conveyor system for use in a baking oven, but it will be understood that certain phases of the invention are not necessarily restricted to such field of use.

In an oven of the kind to which the invention is applicable, a series of trays are transported successively past an access aperture in the front wall of the oven, so that they may be loaded and unloaded as they pass. The trays convey the items to be baked through a path of travel within the oven and in due course return the baked items to the starting point. Usually the path of travel is upward from the loading aperture, thence rearward along the top of the oven chamber, and then back and forth along successively lower tiers or runs of travel. In a relatively simple construction, the trays travel rearwardly along one substantially horizontal run and return along a lower run, the conveyor thus moving through a single loop of travel which includes a substantially U-shaped arc at each end. It is this type of conveyor which I have herein chosen for illustration.

A general object of the invention is to provide an improved and simplified means for maintaining the trays in a normal angularity to the horizontal throughout their travel. It is a more particular object to achieve this result in a system which comprises a pair of spaced aligned conveyor chains and a series of trays supported between them and pivotally articulated to each chain.

Since the articulation and the stabilization and guidance mechanism is the same at both ends of the tray, reference will be made hereinafter to only one of the chains and to the cooperating pins, rollers and other elements which are associated with it.

In accordance with my invention, each tray is provided with a centrally disposed pivot by means of which it is supported by the chain. A pair of horizontally aligned rollers or equivalent elements are carried by the tray on opposite sides of the pivot, respectively, and during each of the horizontal runs of travel of the chain and tray these rollers rest upon and move in guided and supported relation along a guide rail. This rail may be of such width that it serves also to support the chain itself. At each arcuate travel portion, the leading one of said rollers is guided and stabilized by a relatively fixed roller guide of arcuate character, while the trailing one of said rollers is engaged by a special stabilizing sprocket.

One of the features of the present improvement lies in the fact that at each arcuate travel portion the corresponding chain-guiding sprocket is mounted in axially-aligned relation to said stabilizing sprocket, i. e., it lies at a distance from the curved chain portion as the chain doubles upon itself to reverse its travel. The chain-guiding sprocket engages the chain along both runs and moves in unison with the stabilizing sprocket. It may also serve as a driving sprocket for the chain, if desired.

Another feature of the invention resides in the provision of a second set of horizontally aligned rollers or equivalent elements on the tray at a level above that of the first-mentioned set. These auxiliary rollers are adapted to engage with and find stabilizing support upon a specially-designed shelf which is provided at the extreme end of the upper tier of horizontal travel. This shelf is in effect an elevated continuation of the guide rail upon which the tray is supported during its upper run of travel.

I achieve these general objects and advantages, and such other objects and advantages as may hereinafter appear or be pointed out, in the manner illustratively exemplified in the accompanying drawings in which:

Figure 1 is an elevational view of the chain which is mounted along one side wall of the oven, its movement being along the direction of the arrow, and the trays being omitted for the sake of clearness;

Figure 2 is an enlarged view of the left end of Figure 1, showing an illustrative tray in cross-section and other elements which are omitted from Figure 1;

Figure 3 is a cross-sectional view taken substantially along the line 3—3 of Figure 2;

Figure 4 is a cross-sectional view taken substantially along the line 4—4 of Figure 2;

Figure 5 is a cross-sectional view taken substantially along the line 5—5 of Figure 2;

Figure 6 is a fragmentary plan view taken substantially along the directions 6—6 of Figure 2;

Figure 13 is a perspective view of an illustrative tray.

Figure 7:
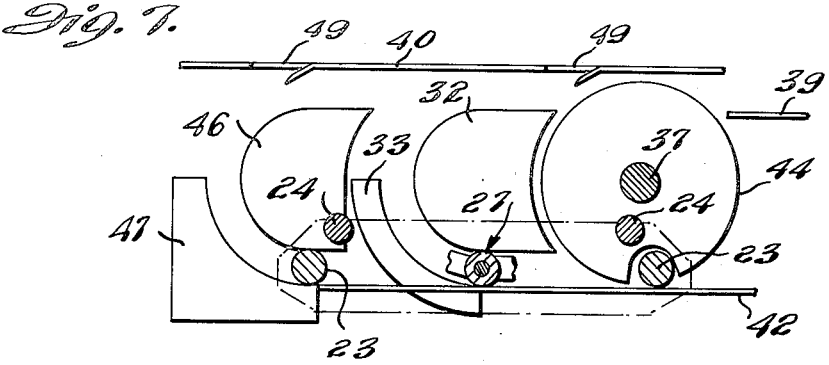
Figures 7–9 are diagrammatic views indicating the stabilization of a tray at the left end of Figure 1.

An understanding of the nature and mode of operation of the invention will be facilitated by referring first to Figure 13. In this figure I have shown an illustrative tray of the character which may be used where the invention is applied to an oven of the character hereinbefore mentioned. The tray shown has a flat body portion 20 upon which the items to be baked are supported. Usually these items are applied to a separate flat element or "peel" which is placed bodily upon the tray portion 20. The tray 20 is preferably as wide as the oven chamber will permit. At its opposite side edges there are upstanding walls 21, and projecting from each of these walls are the pivot pin and roller elements shown at the right end of Figure 13. Centrally disposed is a relatively long pivot 22 by means of which the tray is articulated to the chain at the corresponding side of the oven. On opposite sides of the pivot 22 are the rollers or equivalent elements 23. These rollers are horizontally aligned with each other and with the pivot 22. At a slightly elevated level there is a second or auxiliary set of rollers or equivalent elements 24, also aligned horizontally with each other. The rollers 23 are shorter in length than the pivot 22, and the rollers 24 are shorter than the rollers 23.

As has been mentioned, there is a similar set of elements on each of the side walls 21 of the tray, but because of the symmetry involved a description of one side of the conveyor system is sufficient to explain the features of the invention, and for the sake of simplicity the reference numerals 21, 22, 23 and 24 are used throughout the specification and the several figures to designate the parts corresponding to those shown in Figure 13, regardless of which tray side is involved.

Referring now to Figures 1 and 3: One of the side walls of the oven is designated 25, and for structural reasons it may be desirable to provide a metal supporting plate 26 on its inner surface. Mounted for movement alongside this wall is a conveyor chain 27 which may be of the usual linked kind, the links being arranged in spaced pairs and being pivotally connected to one another. (In Figure 5, one pair of chain links is shown at 28, the adjacent pair at 29, and the connecting pivot or roller at 30, the parts being pivotally united with the aid of a pin 31.) The chain shown is intended to move in the direction of the arrow of Figure 1, i. e., toward the right along the upper tier or run of travel, and toward the left along the lower run. At the left, where the chain curves along an arc to reverse its travel, it rides in sliding relation over a fixed arcuate chain guide 32 having a suitably convex surface. This guidance may be enhanced by the provision of an auxiliary concave chain guide 33 which prevents sagging of the chain. At the right end of Figure 1, there is a similar convex chain guide 34. An auxiliary concave chain guide is not usually necessary where the chain movement is downward, as at this end.

Adjacent to but spaced from each arcuately curved chain portion is a chain-guiding sprocket. The one at the left of Figure 1 is designated 35, the one at the right, 36. Either one, or both, may serve as a driving instrument if desired. Each one engages the chain along both runs of travel, as shown, the teeth of the sprocket engaging with the chain, between the chain pivots, in well-known fashion. The sprocket 35 is mounted on a shaft 37, and if this shaft is to serve as a drive shaft it is in keyed relation to the sprocket, as shown. The sprocket 36 is mounted on the shaft 38 but need not be keyed to it.

Figure 9:
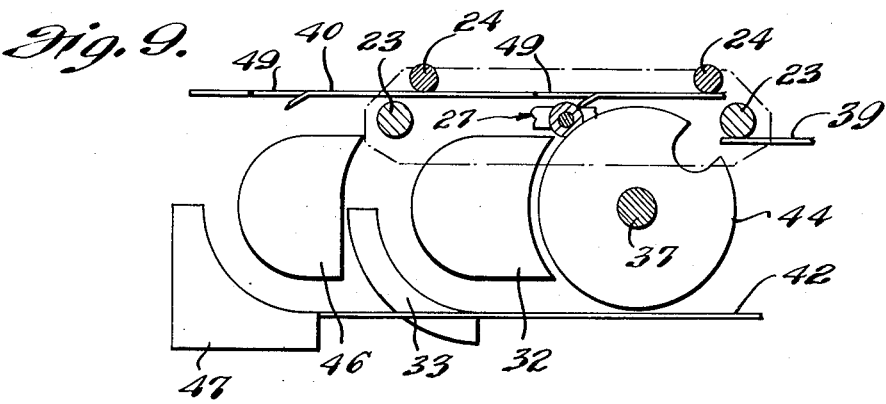
Figure 10:
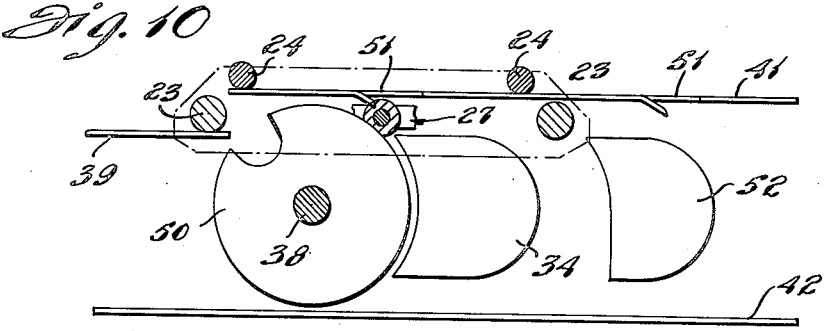
Figures 10–12 are similar diagrammatic views of the stabilization at the right end of Figure 1.
Figure 11:
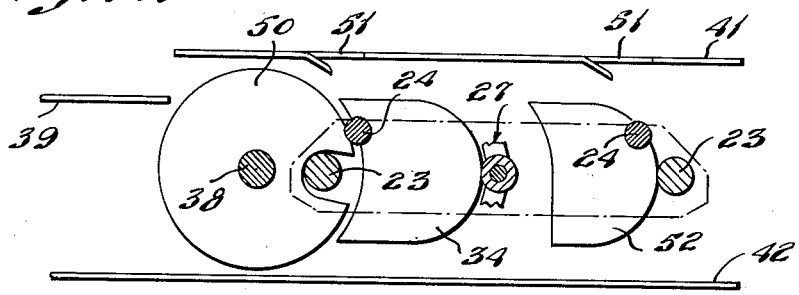
Figure 12:
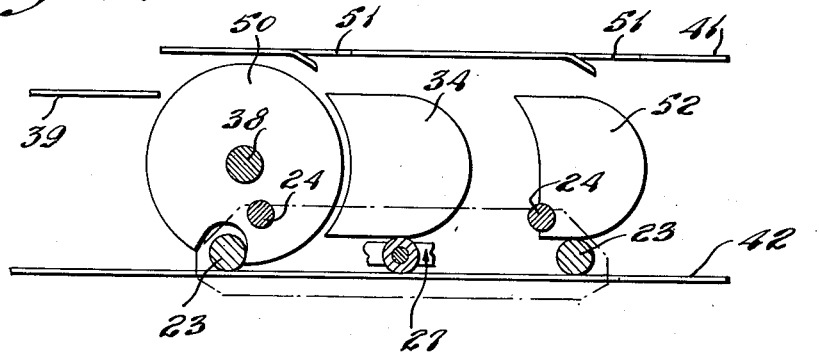

Extending between the sprockets 35 and 36, along the upper run of travel, is a guide rail 39 upon which the chain may slide. Since this rail is necessarily below the level of the uppermost teeth of the sprockets, it terminates adjacent to the sprockets, as shown. It is continued, however, in effect, by the elevated shelf 40 at one end (Figures 2, 6, 7–9), and by the similar elevated shelf 41 at the other (Figures 10–12). Along the lower run of travel of the chain, there is another guide rail 42, and since this rail lies below the level of the sprockets it continues past the sprockets at each end. The chain rides along this guide rail during its lower run of travel.

If the sprocket 35 is a driving sprocket, it is desirable to provide a back plate 43 adjacent to its upper periphery (Figure 1 and 4), to engage the outer surface of the chain at this region and prevent undesired buckling.

At selected spaced regions along the chain, the trays are articulated to it. This is best shown in Figure 5. The pivot 22 is aligned with one of the chain pivots, such as that shown at 30, and the pin 31 is extended to secure these pivots in aligned relation.

The stabilization of the tray, during its travel along the lower horizontal run, is effected by extending the width of the rail 42 to an extent which is sufficient to afford support for the rollers 23 (Figures 2, 4, 5 and 7). Since both rollers 23 are thus guided along the rail, the tray remains in its normal angularity to the horizontal and cannot tip or sway. Similarly, during its travel along the upper run, the rollers 23 rest and ride upon the rail 39 which is made wide enough for this purpose (Figures 2, 9 and 10). The stabilization of the tray as it is transported through the arcuate parts of its travel is effected by a special roller guide positioned to be encountered by the leading one of the rollers 23, a special stabilizing sprocket which engages the trailing roller 23, and by the momentary engagement of the rollers 24 with the shelves 40 and 41.

Referring now to Figures 2, 3 and 4, it will be observed that there is a sprocket 44 coaxially mounted with respect to the chain-guiding sprocket 35. These sprockets are arranged to rotate in unison and to achieve this they may both be keyed to the shaft 37, or, as shown, they are both secured to a common collar 45 which is keyed to the shaft. The stabilizing sprocket 44 is positioned further from the oven wall than the sprocket 35, and is in the plane of movement of the rollers 23. Its teeth are so spaced and of such size, relative to the spacing and size of the rollers 23, that it engages these rollers successively as they pass by. It is the sprocket 44 which is shown in Figure 2; the sprocket 35 is directly behind it and is therefore not visible in this figure.

Figure 8:
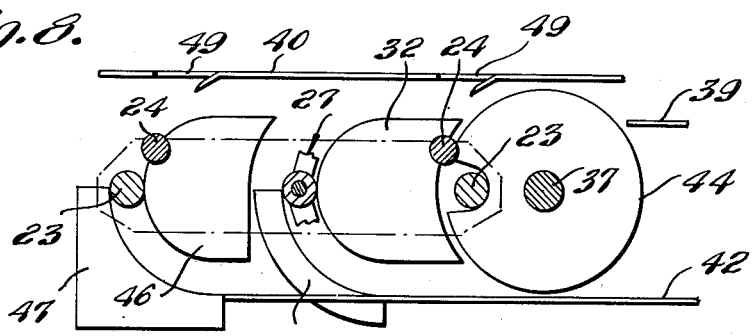

As the chain moves upwardly around the chain guide 32 (Figures 1 and 2), the trailing one of the rollers 23 remains in engagement with the sprocket 44 as shown most clearly in Figure 8. At the same time, the leading roller 23 enters the curved roller guide channel which is formed between the fixed convexly curved element 46 and the parallel concave element 47. The latter is mounted on a bracket 48, and constitutes a curved continuation of the guide rail 42, so far as the roller 23 is concerned.

The tray thus remains in its normal angularity to the horizontal as it moves upwardly toward the upper level. As it approaches this level, the rollers 24 enter openings 49 in the shelf 40 (Figures 2, 6, 7–9) and assume positions resting on this shelf (Figure 9). This serves to support and stabilize the tray until the rollers 23 again take over the support of the tray by resting and riding upon the upper guide rail 39.

At the rear end of the travel, a similar operation takes place, but in reverse order. There is a stabilizing sprocket 50 coaxially mounted and rotating in unison with the chain-guiding sprocket 36, and its teeth engage with the rollers 23 as they pass by. As these rollers move off the guide rail 39 (Figure 10) the upper set of rollers 24 takes over and supports the tray upon the shelf 41. Then, as the chain starts to curve downwardly around the guide 34, the rollers 24 pass downwardly through openings 51 in the shelf 41. At the same time, the leading roller 23 rides upon the fixed convex roller guide 52 (Figures 1 and 10–12) while the trailing roller remains in engagement with the stabilizing sprocket 50. Ultimately, the rollers 23 rest upon the rail 42 again (Figure 12).

At the rear end, i. e., wherever the tray is being lowered by the chain, there is no need for a concave guide element corresponding to that shown at 47.

The invention is obviously not restricted to a single loop of travel of the character shown. The circuit may be of greater complexity, and may involve, for example, a series of runs of travel at successive levels. In each case, however, wherever the chain curves upwardly, the parts and elements may be arranged and caused to function as shown in Figures 7–9, and wherever the chain curves downwardly, the construction and operation shown in Figures 10–12 may be resorted to.

In general, it will be understood that changes in the details herein described and illustrated may be made by those skilled in the art without necessarily departing from the spirit and scope of the invention as expressed in the appended claims.

Having thus described my invention and illustrated its use, what I claim as new and desire to secure by Letters Patent is:

1. In a conveyor system, an endless chain, a chain-guiding sprocket, an element provided with a pivot and supported thereby on said chain for transportation along the cycle of travel of said chain, and means for maintaining said element in a predetermined angularity to the horizontal, said means comprising a pair of spaced horizontally-aligned rollers carried by said element on opposite sides of said pivot respectively, a stabilizing sprocket coaxially mounted with said chain-guiding sprocket and adapted to engage said rollers as the element passes, and a fixed roller-guide positioned for encounter by one of said rollers as the element is carried through the arcuate path around said sprockets.

2. In a conveyor system, an endless chain, means for moving the chain along a closed path of travel which includes an arc at which the chain reverses its travel from one substantially horizontal run to another, a chain-guiding sprocket adjacent to but spaced from said arc and engaging said chain along both runs, a tray provided with a pivot and supported thereby on said chain for transportation along the cycle of travel of said chain, and means for maintaining said tray in a predetermined angularity to the horizontal, said means comprising a pair of horizontally-aligned rollers carried by said tray on opposite sides of said pivot respectively, a stabilizing sprocket coaxially mounted with said chain-guiding sprocket and adapted to engage said rollers as the tray passes, and a fixed roller-guide positioned for encounter by one of said rollers as the tray is carried through said arcuate path.

3. In a conveyor system, the combination of elements set forth in claim 2, said chain-guiding and stabilizing sprockets being operatively connected to rotate in unison.

4. In a conveyor system, the combination with the elements set forth in claim 2, of a guide rail engaging said tray at opposite sides of said pivot during the movement of said tray along each of said runs of travel.

5. In a conveyor system, the combination with the elements set forth in claim 2, of a guide rail engaging said rollers during the movement of said tray along each of said runs of travel.

6. In a conveyor system, the combination with the elements set forth in claim 2, of a guide rail engaging said rollers during the movement of said tray along each of said runs of travel, the upper guide rail terminating at said stabilizing sprocket, a guide shelf at an elevated level above said sprocket, and an auxiliary set of rollers carried by said tray for engagement with said shelf while the first-mentioned rollers are out of engagement with said upper guide rail.

7. In a conveyor system, an endless chain, means for moving the chain along a closed path of travel which includes an arc at which the chain reverses its travel from one substantially horizontal run to another, a chain guide engaging said chain along said arcuate path, a chain-guiding sprocket adjacent to but spaced from said arc and engaging said chain along both runs, and a tray provided with a centrally-disposed pivot and supported thereby on said chain for transportation along the path of travel of said chain.

8. In a conveyor system, an endless chain, means for moving the chain along a closed path of travel which includes an arc at which the chain reverses its travel from one substantially horizontal run to another, a chain guide engaging said chain along said arcuate path, a chain-guiding sprocket adjacent to but spaced from said arc and engaging said chain along both runs, a tray provided with a centrally-disposed pivot and supported thereby on said chain for transportation along the path of travel of said chain, and means engaging the tray at at least one point spaced from the pivot during the movement of the tray along said arcuate path in order to retain the tray in its normal angularity to the horizontal.

9. In a conveyor system, an endless chain, means for moving the chain along a closed path of travel which includes an arc at which the chain reverses its travel from one substantially horizontal run to another, a chain guide engaging said chain along said arcuate path, a chain-guiding sprocket adjacent to but spaced from said arc and engaging said chain along both runs, a tray provided with a centrally-disposed pivot and supported thereby on said chain for transportation along the path of travel of said chain, and means engaging the tray at at least one point spaced from the pivot during the movement of the tray along said arcuate path in order to retain the tray in its normal angularity to the horizontal, said means comprising a roller on said tray, and a stabilizing sprocket adapted to engage said roller and coaxially mounted and rotating in unison with said chain-guiding sprocket.

10. In a conveyor system, an endless chain, means for moving the chain along a closed path of travel which includes an arc at which the chain reverses its travel from one substantially horizontal run to another, a chain guide engaging said chain along said arcuate path, a chain-guiding sprocket adjacent to but spaced from said arc and engaging said chain along both runs, a tray provided with a centrally-disposed pivot and supported thereby on said chain for transportation along the path of travel of said chain, and means engaging the tray at at least one point spaced from the pivot during the movement of the tray along said arcuate path in order to retain the tray in its normal angularity to the horizontal, said means comprising a pair of rollers on said tray, a roller guide positioned to be encountered by the leading roller, and a second roller guide concentric and movable with said chain-guiding sprocket for engaging the trailing roller.

11. In an oven, tray-conveying means including an endless chain, a drive sprocket near each of the looped ends of the chain, a tray pivoted to said chain, projections on the ends of the tray on opposite sides of the pivot axis of the tray, a timing sprocket adjacent to and on the same shaft as the drive sprocket and having the same pitch diameter as the drive sprocket, said timing sprocket engaging one of the projections of the tray to control its planar relation with respect to the pivot axis of the tray as the direction of movement of the chain is reversed.

12. In a device of the class described, an endless chain, a drive sprocket near the end of said chain, a timing sprocket on the shaft of the drive sprocket and disposed adjacent said drive sprocket, said sprockets having the same pitch diameter, a tray pivoted to said chain, studs extending from the end of said tray on opposite sides of the pivot axis, said device having curved guideways disposed beyond said sprockets and of the same arcuate radius as the sprockets, one of said guide-ways to receive the chain and the other to receive one of said studs, whereby the movements of these portions are guided in the reversal of the movement of the chain.

13. In an oven, conveying means including an endless chain, a drive sprocket near the end of said chain, a timing sprocket moved in company and in alignment with the drive sprocket and disposed adjacent said drive sprocket, said sprockets having the same pitch diameter, a tray pivoted to said chain, studs extending from the end of said tray on opposite sides of the pivot, a shoe disposed beyond the drive sprocket and having a surface over which the chain passes in reversing its direction of motion, the radius of curvature of said surface being the same as that of the drive sprocket, and a second shoe beyond the first shoe to receive and guide one of the studs and having the same radius of curvature on its stud-engaging surface.

MANFRED MASSIELLO.

REFERENCES CITED

The following references are of record in the file of this patent:

UNITED STATES PATENTS

| Number | Name | Date |
|---|---|---|
| 599,037 | Ford | Feb. 15, 1898 |
| 1,364,020 | Barletta | Dec. 28, 1920 |
| 2,068,070 | Pray | Jan. 19, 1937 |
| 2,195,326 | Crawford | Mar. 26, 1940 |